Dec. 12, 1961     P. N. ARMSTRONG     3,013,249
SORT-COMPLETION DETECTION APPARATUS
Filed July 25, 1960     7 Sheets-Sheet 3

FIG. 4.

INVENTOR.
PHILIP N. ARMSTRONG,
BY Robert H. Himes
ATTORNEY.

Dec. 12, 1961 P. N. ARMSTRONG 3,013,249
SORT-COMPLETION DETECTION APPARATUS
Filed July 25, 1960 7 Sheets-Sheet 6

INVENTOR.
PHILIP N. ARMSTRONG,
BY Robert H. Himes
ATTORNEY

FIG. 6.

United States Patent Office 3,013,249
Patented Dec. 12, 1961

3,013,249
SORT-COMPLETION DETECTION APPARATUS
Philip N. Armstrong, Santa Monica, Calif., assignor to
Hughes Aircraft Company, Culver City, Calif., a corporation of Delaware
Filed July 25, 1960, Ser. No. 44,991
4 Claims. (Cl. 340—172.5)

This invention relates to a sort-completion detection apparatus for a digital computer sorting device and, more particularly, to an apparatus for detecting the completion of the sort operation in an apparatus disclosed in a co-pending application for patent entitled Minimal Storage Sorter, Serial No. 771,482, filed November 3, 1958, by Philip N. Armstrong, which application is assigned to the same asignee as is the present case.

In the operation of the aforementioned sorter apparatus, an amount of sorting time is required which is a function of the order of the arrangement of the data as it is presented to the sorter. For this reason, means are required to determine when the sorting operation is complete. Essentially, there appear to be two alternatives, i.e., either permit the sorting apparatus to run for a sufficient length of time to sort that arrangement which requires the most time, or test the sequence of data at frequent intervals to determine as soon as possible when the sort is complete. It is apparent that the sorting apparatus will require much more time for some arrangements than for others so that the allocation of adequate time to sort the "worst" arrangements of character data is not advisable.

It is therefore an object of the present invention to provide an improved apparatus for detecting the completion of the sort in the operation of the aforementioned digital computer apparatus for sorting binary numbers.

Another object of the present invention is to provide an apparatus capable of determining the completion of the sort operation within one complete pass after the sorting operation is, in fact, completed.

Still another object of the present invention is to provide a sort-completion detection apparatus with a minimum of additional apparatus and related components.

In accordance with the present invention, use is made of the fact that once a sort has been completed there are certain required exchanges in the sorting circuitry of the aforementioned apparatus for sorting binary numbers necessary to continually retain the file in a sorted condition. In particular, appropriate outputs from the flip-flops of the respective two-way compare-sort apparatuses of the sorting network are sampled at the end of each record block to test whether or not only the required exchanges are made incident to the file being sorted.

A counter is employed to register the number of times in sequence that only required exchanges incident to the file being sorted are made. When exchanges other than those incident to the file being sorted are made, the apparatus is adapted to reset the counter so that when subsequent required exchanges are made, the count commences over from zero. When the count reaches a number that is preferably substantially equivalent to the number of record blocks in the file being sorted and, in any event, no less than the number of record blocks in the largest memory employed, a sort completion signal is generated. This signal may be utilized to generate a visual indication that the sort is completed or, alternatively, to terminate the sort operation. In the latter case where a count is used that is equal to the number of record blocks in the longest memory, the sort complete indication is not conclusive.

The above-mentioned and other features and objects of this invention and the manner of obtaining them will become more apparent by reference to the following description taken in conjunction with the accompanying drawings wherein.

In general, the apparatus described in the aforementioned application for patent entitled Minimal Storage Sorter is adapted to perform certain rearrangements for collections of record blocks. A record block may, for example constitute a collection of 80 characters of 6 bits each. The minimal storage sorter is designed to perform sorting of these characters so that when the procedure is completed the record blocks will be in such an order that the sequence of characters in their respective blocks will increase or decrease in only one direction. The number composed of the characters of each record block which are to be sorted is designated as the "control number" of the block. The control numbers may or may not be the same length as the record blocks but must necessarily be of uniform lengths. The apparatus is designed to have a capacity to sort sequences of records of a magnitude that is limited only by the available memory.

The minimal storage sorting apparatus includes a plurality of delay devices which may constitute a plurality of memory elements with associated read-write apparatus. These memory elements are characterized in that at least one is adapted to provide storage for only one record block. This one record block plus the quantity of record blocks capable of being stored by the remaining memory elements equal the number of control numbers which may be sorted in one operation. The memory elements may be arranged in any arbitrary order or sequence. That is, it is not necessary that the size of the memory elements progressively increase or decrease. The sequence of memory elements will, however, be arranged so that in proceeding in a predetermined direction along the sequence of elements, the input to each memory element will appear prior to the output thereof. It is apparent that the storage medium for one or all of the memory elements may be provided by one or more magnetic drums, continuous tape files, or tape files of "infinite" length. Alternatively, sonic delay lines or other similar type device may be used. Irrespective of the type of delay device employed, however, it is necessary that each device provide a delay substantially equal to a preselected integral number of record blocks.

In describing the apparatus of the present invention, a convention is employed wherein individual "and" and "or" gates are shown as semicircular blocks with the inputs applied to the straight side and the output appearing on the semicircular side. An "and" gate is indicated by a (.) and an "or" gate by a plus (+) in the semicircular block. As is generally known, an "and" gate produces a "one" or information level output signal only when every input is at the information level, whereas an "or" gate produces an information level output signal when any one of the input signals thereto are at the information level.

Also, in addition to the above, a convention is employed in describing the particular embodiment of the present invention wherein the upper and lower inputs to the flip-flops, as they appear in the drawing, are designated as the "set" and "reset" inputs, respectively. An information level signal applied to either the set or reset inputs of a flip-flop will change its state in a manner such that an information level signal appears at the corresponding principal or complementary output terminals, respectively. Further, if information level signals are applied to both the set and reset inputs of a flip-flop, the state of the flip-flop will change in accordance with the last signal applied.

Figure 1:
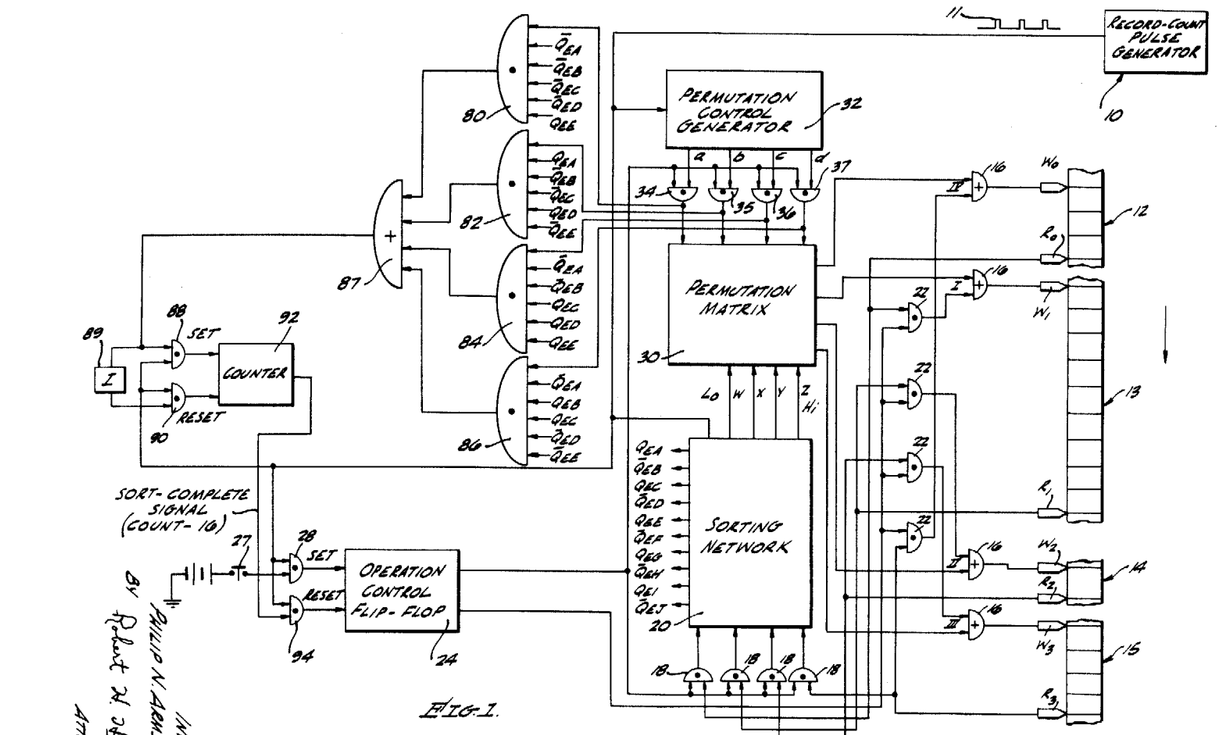
FIG. 1 is a schematic block diagram of a preferred embodiment of the present invention.

Referring now to FIG. 1 of the drawings, there is shown a preferred embodiment of the device of the present invention which functions in conjunction with the above-described data handling system. The combined system comprises record-count pulse generator 10, which may constitute a magnetic tape file or a portion of a magnetic drum that provide a memory for record pulses 11 which are spaced so as to indicate the transitions between successive record blocks. In addition, the system includes four additional memories, by way of example, constituting tracks 12, 13, 14 and 15. The tracks 12–15 move at a constant uniform velocity from left to right, as viewed in the drawing. The inputs to the memories provided by tracks 12–15, inclusive, will in each case be at the respective left extremities thereof and the outputs at the respective right extremities thereof as viewed in the drawing. It is evident that the tracks 12–15 may be provided by a magnetic drum, not shown, or by portions of a magnetic tape file. In any event, as mentioned above, it is necessary that the velocities at which the tracks 12–15 are moved be synchronized with pulse waveform 11 generated by the record-count pulse generator 10. The tracks 12–15 are provided, respectively, with writing heads $W_0$, $W_1$, $W_2$ and $W_3$ which are disposed at the respective left extremities as viewed in the drawing. Each writing head is provided with an "or" gate 16 to enable information to be written on the tracks from a plurality of sources. The inputs to the "or" gate 16 leading to writing head $W_1$ is designated station I. Similarly, the inputs to "or" gates 16 leading to writing heads $W_2$, $W_3$ and $W_0$ are designated as stations II, III and IV, respectively.

The delay provided by each of the tracks 12–15 is determined by the spacing between the respective writing heads $W_0$ to $W_3$ and its associated reading head. In the present case, a reading head $R_0$ is spaced three record blocks from its associated writing head $W_0$. Thus, the storage provided by track 12, together with read-write heads $R_0$ and $W_0$ amounts to three record blocks. Similarly, a reading head $R_1$ is spaced eight record blocks from its associated writing head $W_1$ at the right extremity of track 13, as viewed in the drawing, whereby track 13 provides storage for an additional eight record blocks. Reading head $R_2$, on the other hand, is spaced only one record block from its associated writing head $W_2$ at the right extremity of track 14, thereby providing storage of one record block. Lastly, reading head $R_3$ is spaced four record blocks from its associated writing head $W_3$ at the right extremity of track 15 as viewed in the drawing, thereby to provide a corresponding storage. Thus, the tracks 12–15, together with their associated read-write heads, provide memory for 16 record blocks which, of course, limits the quantity of control numbers which may be sorted to 16. Additional memory may be used to expand the capacity of the device to any desired amount. The embodiment of the apparatus of the present invention with memory provided for only 16 record blocks is described and explained for purposes of illustration and is not to be considered as a limitation on the capacity of the device to sort control numbers. Further, it is not essential that the individual memory elements, i.e., tracks 12–15, provide storage for any given number of record blocks or that the memory elements be arranged in any particular order as to size. It is only necessary that one of the memory elements provide storage for only one record block.

The outputs from the reading heads $R_0$–$R_3$ are applied through "and" gates 18 to the input leads $m$, $n$, $o$ and $p$, respectively, of a sorting network 20 and, in addition, through "and" gates 22 to stations I, II, III and IV, respectively. In addition to the foregoing, an operation control flip-flop 24 has a lead 25 connected from its complementary output to an input to each of the "and" gates 22 and a lead 26 connected from its principal output to an input of each of the "and" gates 18. Prior to the sort operation and after the sort operation has been completed there exists an information level signal on the complementary output lead 25 applied to the "and" gates 22 from the operation control flip-flop 24 and a zero level signal on the lead 26 applied to the "and" gates 18 whereby the information stored on the tracks 12–15 circulates from one track to the next, during which time information may be written on the tracks 14–15 through any of the stations I to IV in a manner such that the most significant bits of each respective record block are written first. Also, while the information is circulating from one track to the next in such a manner, it is evident that information stored on all of the tracks 12–15 may be read out from any one of the reading heads $R_0$ to $R_3$.

The sorting operation is initiated by changing the state of the operation control flip-flop 24 so as to produce an information level signal on lead 26 which is connected to the inputs of the "and" gates 18 and remove the information level signal from lead 25 which is connected to the inputs of the "and" gates 22. This may be instrumented, for example, by applying an information level voltage through a "commence-sort" switch 27 along with record pulses 11 through an "and" gate 28, to the set input of the operation control flip-flop 24. An information level voltage is gated with the record pulses 11 through the "and" gate 28 in this manner so as to commence the sort operation at the beginning of a record block. In that the control numbers may have any random arrangement at the beginning of the sort operation, it is not essential that the sort operation commence with any particular record block. The switching of the information level signal from the inputs of "and" gates 22 to the inputs of the "and" gates 18 effectively connects the outputs from the reading heads $R_0$–$R_3$ to the input leads $m$, $n$, $o$ and $p$, respectively, of the sorting network 20. Essential details of the sorting network 20, together with its operation, will be hereinafter described. In general, the sorting network 20 functions in a manner such that the lowest to the highest control numbers fed in on input leads $m$, $n$, $o$ and $p$ are latch-connected to output leads $w$, $x$, $y$ and $z$, respectively, during each record block interval.

Figure 6:
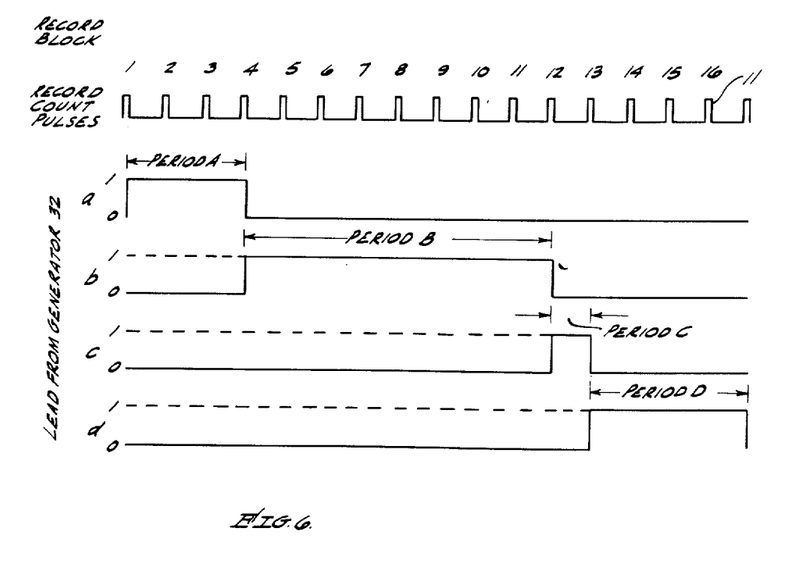
FIG. 6 illustrates voltage waveforms generated by the record count pulse generator and the permutation control generator in the apparatus of FIG. 1.

A permutation matrix 30 in response to control signals produced by a permutation control generator 32, which signals appear on leads $a$, $b$, $c$ and $d$, cyclically switches the control numbers appearing on leads $w$ to $z$ to stations I to IV, which stations are connected through the "or" gates 16 to the writing heads $W_1$–$W_3$ and $W_0$, respectively. In general, the permutation control generator 32 is adapted to control the switching in a manner such that the leads $w$ to $z$ are connected to the stations I to IV for a number or record block intervals equal to the three record blocks which separate writing head $W_0$ and reading head $R_0$ along track 12. This interval of time is designated "period A" in the present description. Next the leads $w$ to $z$ are connected to stations II to IV and I, respectively, for an interval designated as "period B" equal to eight record block intervals separating writing head $W_1$ from the reading head $R_1$ along track 13. The leads $w$ to $z$ are then successively connected to stations III, IV, I and II, and stations IV, I, II and III for the number of record block intervals separating the read-write heads associated with tracks 14 and 15, respectively. In the instant case, these intervals are designated as periods C and D which are equal, respectively, to one and four record blocks. In that it is desired that this switching be effected by the permutation control generator 32, information level signals are generated on the leads $a$, $b$, $c$ and $d$ to correspond to the aforementioned periods as illustrated in FIG. 6; that is, an information level signal is produced on lead "$a$" during period A, on lead "$b$" during the period B, on lead "$c$" during period C, and on lead "$d$" during the interval D. The permutation control generator 32 may include, for example, a record counter responsive to the record count pulses 11 which, with appropriate gating, produces the required information level signals during periods A, B, C and D, on output leads $a$, $b$, $c$ and $d$, respectively. In that it is desired to only have the aforementioned signals available on leads $a$, $b$, $c$ and $d$ impressed on the permutation matrix 30, the principal output signal from the operation control flip-flop 24 generated on the lead 26 together with leads $a$, $b$, $c$ and $d$ are connected to respective inputs of "and" gates 34, 35, 36, and 37.

The permutation matrix 30 is adapted to operate in conjunction with four memory elements, namely, the tracks 12–15. The permutation matrix 30 operates in the same manner as in the aforementioned application for patent, Serial No. 771,428. In general, the permutation matrix connects the leads $w$, $x$, $y$ and $z$ to stations I, II, III and IV, respectively, for three record blocks, the storage provided by track 12; to stations II, III, IV and I, respectively, for eight record blocks, the storage provided by track 13; to stations III, IV, I and II, respectively for one record block, the storage provided by track 14; and to stations IV, I, II and III, respectively, for four record blocks, the storage provided by track 15.

Figure 2:
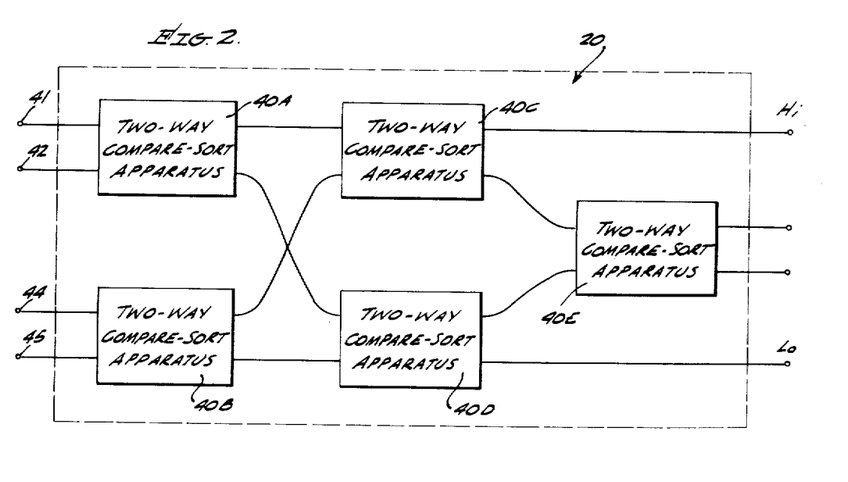
FIG. 2 is a schematic block diagram illustrating one example in which a four-way compare-sort network for the sorting network of FIG. 1 may be realized.

In order to more clearly describe the present invention, it is first necessary to describe the sorting network 20, together with certain characteristics associated with its operation. Referring to FIG. 2, there is shown a typical four-way compare-sort apparatus 20 composed of five two-way compare sort apparatuses. The four-way compare-sort apparatus 20 may comprise, for example, a two-way compare-sort apparatus 40A having inputs connected to input terminals 41, 42 and, in addition, a two-way compare-sort apparatus 40B having input terminals 44 and 45. The high outputs of the two-way compare-sort apparatus 40A, 40B are applied to the inputs of a two-way compare-sort apparatus 40C and the low outputs of the two-way compare-sort apparatus 40A, 40B are applied to the inputs of a two-way compare-sort apparatus 40D. The high output from the two-way compare-sort apparatus 40C and the low output from the two-way compare-sort apparatus 40D provide the high output and the low output, respectively, from the four-way compare-sort apparatus 20. The low output from the two-way compare-sort apparatus 40C and the high output from the two-way compare-sort apparatus 40D are, however, applied to the input of an additional two-way compare-sort apparatus 40E. The outputs from the two-way compare-sort apparatus 40C provide the intermediate high and low outputs of the four-way compare-sort apparatus 20. There are, nevertheless, numerous different ways in which two-way compare-sort apparatus may be interconnected to achieve a four-way compare-sort device. The concepts of the present invention are, however, not restricted or limited to any one particular way of interconnecting the two-way compare-sort apparatuses. Also, the same concepts are applicable irrespective of the number of inputs of the compare-sort apparatus.

The individual two-way compare-sort apparatus 40A, 40B, 40C, 40D or 40E may be provided as taught by the disclosures in applications for patent entitled Two-Way Data Compare-Sort Apparatus, Serial No. 777,551, filed November 28, 1958, by Philip N. Armstrong et al., and Two-Way Data Compare-Sort Apparatus, Serial No. 784,493, filed January 2, 1959, by Philip N. Armstrong et al., which applications are assigned to the same assignee as is the present case.

Figure 3:
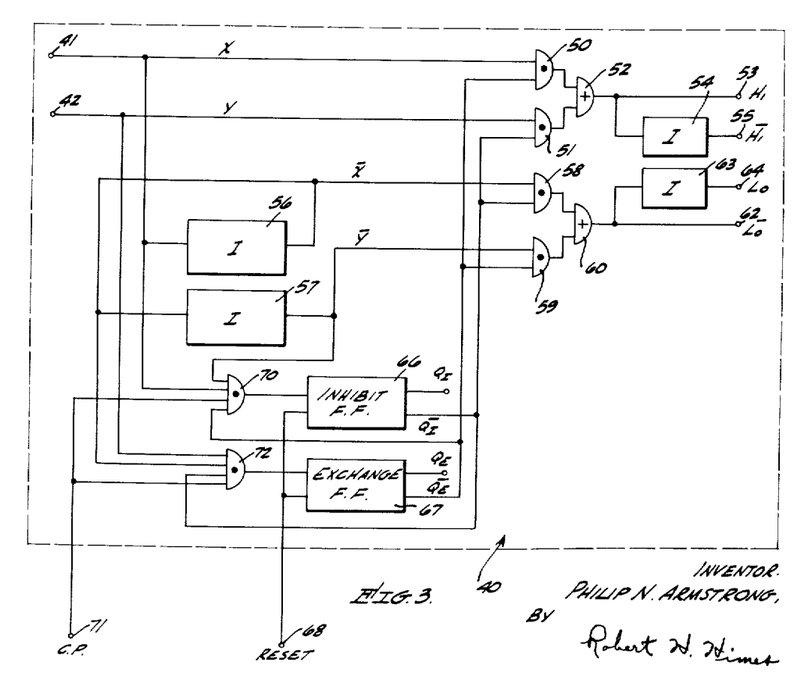
FIG. 3 shows an illustrative embodiment of a two-way compare-sort apparatus of the sorting network of FIG. 2.

Referring to FIG. 3, there is shown one embodiment by way of example of a two-way compare-sort apparatus 40, which apparatus is disclosed and described in the aforementioned application for patent, Serial No. 771,551. The apparatus 40 is adapted to receive first and second input signals X, Y at terminals 41, 42, respectively. In order to effect sorting, it is necessary that these input signals constitute binary words arranged with the most significant bits first in time. The terminals 41, 42 are connected through "and" gates 50, 51, respectively, to the inputs of an "or" gate 52, the output of which is connected to a "Hi" output terminal 53. A complementary Hi output, $\overline{Hi}$, is provided by connecting the output of "or" gate 52 through an inverter 54 to a $\overline{Hi}$ output terminal 55. In addition, the terminals 41, 42 are connected through inverters 56, 57, respectively, to the inputs of "and" gates 58, 59, the outputs of which are connected through an "or" gate 60 to a complementary Lo or $\overline{Lo}$ output terminal 62. A low output is then provided by connecting the output of "or" gate 23 through an inverter 63 to a Lo output terminal 64.

Further, the two-way data compare-sort apparatus 40 includes an inhibit flip-flop 66 and an exchange flip-flop 67. Both the inhibit and exchange flip-flops 66, 67 have a reset input terminal 68 to which the record count pulses 11 (FIG. 1) are applied at the commencement of each record block. The set input to the inhibit flip-flop 66 is connected to the output of an "and" gate 70 which, in turn, has inputs connected to terminal 41, the output of the inverter 57, the complementary output of exchange flip-flop 67 and to a clock pulse input terminal 71 thereby to receive signals X, $\overline{Y}$, $Q_E$ and clock pulses, respectively. The set input of the exchange flip-flop 67, on the other hand, is connected to the output of an "and" gate 72 which has inputs connected to input terminal 42, the output of inverter 56 which is connected to input terminal 41, the clock pulse input terminal 71 and to the complementary output of inhibit flip-flop 66 thereby to receive input signals Y, $\overline{X}$, clock pulses and $\overline{Q}_I$, respectively. Lastly, the complementary output of inhibit flip-flop 66 is connected to inputs of "and" gates 57 and 58 and the complementary output from the exchange flip-flop 67 is connected to inputs of "and" gates 50 and 59.

In general, the two-way compare-sort apparatus 40 operates by allowing both of the signals X, Y to flow through the "and" gates 50, 51 or the "and" gates 58, 59 to the Hi output terminal 53 and the Lo output terminal 64, respectively, so long as both signals X and Y are of the same level. When one signal is for the first time of a higher level than the other, e.g., X is at the information level and Y at the zero level or X is at the zero level and Y at the information level, an information level signal is generated at the Hi output terminal 53 and a zero level signal is generated at the Lo output terminal 64. During this bit, the "and" gates 70 or 72 compare whether $X>Y$ or $Y>X$ and accordingly allow the clock pulse to set the corresponding inhibit or exchange flip-flop 66 or 67 which, in turn, latch-connect the larger of X or Y to the Hi output terminal 53 and the lesser of X or Y to the Lo output terminal 64. This condition remains until the end of the record block of data at which time both flip-flops 66, 67 are reset in response to the record block pulses 11. Thus, it is evident that the two-way compare-sort apparatus 40 simultaneously compares and sorts the digital signals X and Y. One characteristic of the apparatus 40 to note, however, is that the exchange flip-flop 67 will be set only when there is an exchange, i.e., when Y is greater than X. In this event, $Q_E$ will be at the information level and $\overline{Q}_E$ at the zero level.

Referring again to FIG. 1 of the drawings, it will be assumed that the sorting network 20 is composed of five two-way compare-sort apparatuses interconnected in the manner described in connection with FIG. 2. In this respect, the principal outputs of the exchange flip-flops 67 are designated $Q_E$ and the complementary outputs as $\overline{Q}_E$. Further, a second subscript identical to that used in the respective reference numerals is used to designate the principal or complementary output of a particular compare-sort apparatus 40. For example, $Q_{EA}$ and $\overline{Q}_{EA}$ designate the principal and complementary outputs, respectively, of the exchange flip-flop 67 of the two-way compare-sort apparatus 40A.

In accordance with the present invention, an "and" gate 80 receives a first input from the output of "and" gate 34; a second input from the complementary output of flip-flop 67 of the compare-sort apparatus 40A; a third input from the complementary output of flip-flop 67 of the compare-sort apparatus 40B; a fourth input from the complementary output of flip-flop 67 of the compare-sort apparatus 40C; a fifth input from the complementary output of flip-flop 67 of the compare-sort apparatus 40D; and a sixth input from the principal output of the flip-flop 67 of the compare-sort apparatus 40E. Thus, the voltage waveform available on lead "a" together with the signals $\overline{Q}_{EA}$, $\overline{Q}_{EB}$, $\overline{Q}_{EC}$, $\overline{Q}_{ED}$ and $Q_{EE}$, respectively, are applied to the inputs of "and" gate 80.

Secondly, an "and" gate 82 receives a first input from the output of "and" gate 35; a second input from the principal output of flip-flop 67 of compare-sort apparatus 40A; a third input from the complementary output of flip-flop 67 of the compare-sort apparatus 40B; a fourth input from the complementary output of the flip-flop 67 of the compare-sort apparatus 40C; a fifth input from the principal output of the flip-flop 67 of the compare-sort apparatus 40D; and a sixth input from the complementary output of flip-flop 67 of compare-sort apparatus 40E. Thus, the voltage waveform available on lead "b" together with the signals $Q_{EA}$, $\overline{Q}_{EB}$, $\overline{Q}_{EC}$, $Q_{ED}$, and $\overline{Q}_{EE}$, respectively, are applied to the inputs of "and" gate 82.

Thirdly, an "and" gate 84 receives a first input from the output of "and" gate 36; a second input from the complementary output of flip-flop 67 of the compare-sort apparatus 40A; a third input from the complementary output of the flip-flop 67 of the compare-sort apparatus 40B; a fourth input from the principal output of the flip-flop 67 of the compare-sort apparatus 40C; a fifth input from the principal output of the flip-flop 67 of the compare-sort apparatus 40D; and a sixth input from the principal output of the flip-flop 67 of the compare-sort apparatus 40E. Thus, the waveform available on lead "c" together with the signals $\overline{Q}_{EA}$, $\overline{Q}_{EB}$, $Q_{EC}$, $Q_{ED}$ and $Q_{EE}$ are applied to the inputs of "and" gate 84.

Lastly, an "and" gate 86 receives a first input from the output of "and" gate 37; a second input from the complementary output of flip-flop 67 of the compare-sort apparatus 40A; a third input from the principal output of the flip-flop 67 of the compare-sort apparatus 40B; a fourth input from the complementary output of flip-flop 67 of the compare-sort apparatus 40C; a fifth input from the complementary output of the flip-flop 67 of the compare-sort apparatus 40D; and a sixth input from the complementary output of the flip-flop 67 of the compare-sort apparatus 40E. Thus, the voltage waveform available on lead "d" together with signals $\overline{Q}_{EA}$, $Q_{EB}$, $Q_{EC}$, $\overline{Q}_{ED}$ and $\overline{Q}_{EE}$, respectively, are applied to the inputs of "and" gate 86.

The outputs of the "and" gates 80, 82, 84, 86 are applied through an "or" gate 87 to one input of an "and" gate 88 and, in addition, is inverted by an inverter 89 and applied to an input of an "and" gate 90. Further, the record count pulses 11 generated by record count pulse generator 10 are applied to inputs of both the "and" gate 88 and the "and" gate 90. The output of the "and" gate 88 is then applied to the set input of a counter 92 and the output of "and" gate 90 to the reset input thereof.

The counter 92 is preferably adapted to count to a number equivalent to the number of record blocks which are to be sorted. In addition, the counter 92 includes a gating network which is adapted to produce an information level signal in response to a number of pulses applied to the set input equal to the number of record blocks to be sorted. This information level signal is designated as a sort-complete signal and in the present case is generated in response to sixteen successive record count pulses applied to the set input of the counter 92. This sort-complete signal is applied to an input of an "and" gate 94 together with the record count pulses 11. The output of "and" gate 94 is, in turn, applied to the reset input of operation control flip-flop 24. Thus, upon the occurrence of a sort-complete signal, the next succeeding record count pulse 11 will reset the operation control flip-flop and thereby cause the data stored in the tracks 12, 13, 14, 15 to circulate directly through the "and" gates 22 rather than through the "and" gates 18, the sorting network 20 and the permutation matrix 30. It may also be desirable, but is not shown, to terminate the sort operation at a particular time during a permutation cycle. This may be readily accomplished by applying an additional gating signal from the permutation control 32 to the "and" gate 94.

Figure 4:
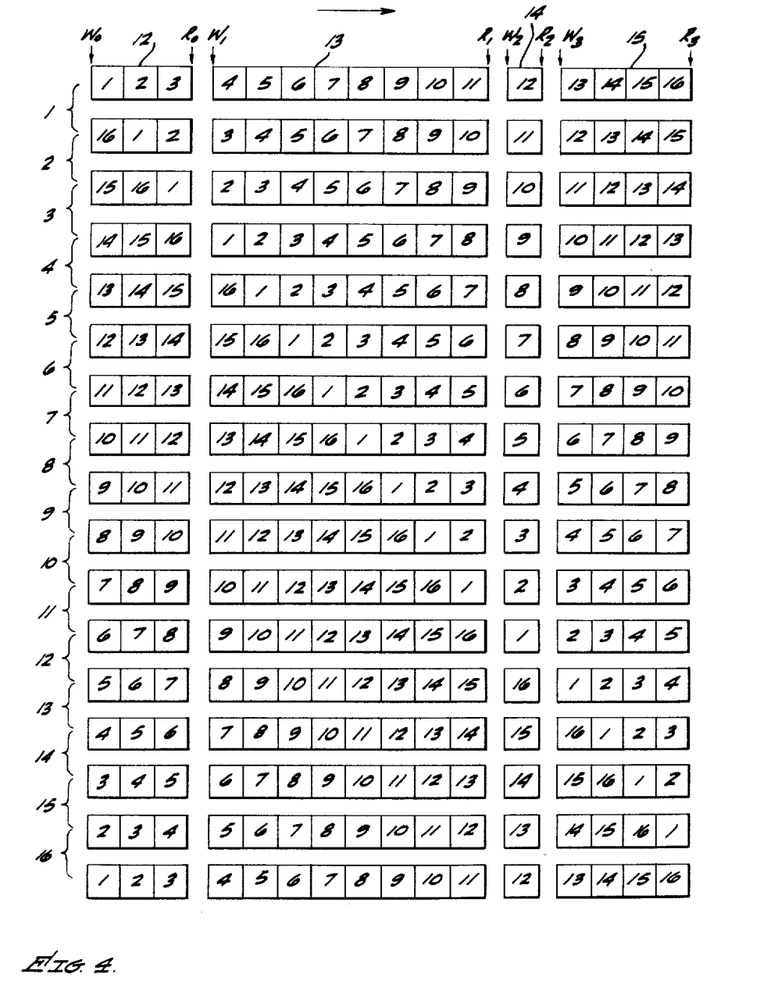
FIG. 4 shows the location of character data in the respective delay lines of the apparatus of FIG. 1 for a complete cycle of permutation after the sort operation has been completed.

To understand more clearly the operation of the apparatus of the present invention, reference is made to FIGS. 4 and 5 wherein the operation of the sorting network 20 subsequent to a sort being complete is examined. FIG. 4 illustrates the tracks 12, 13, 14 and 15 which initially store record blocks arranged in an asecending sequence and wherein the transitions which ttake place as the tracks 12, 13, 14, 15 progress integral numbers of record blocks past the read and write heads are designated as counts 1 to 16, respectively. These counts are indicated at the vertex of the brackets at the left extremity of the tracks 12–15, as shown in the drawing. In general, the numbers coming under the read heads $R_0$, $R_1$, $R_2$ and $R_3$ are applied to the inputs of the sorting network 20 which, in turn, are simultaneously compared and sorted in a manner such that the numbers appear in an ascending sequence as viewed from top to bottom in FIG. 2 of the drawings. It will be appreciated that the output signals from read heads $R_0$, $R_1$, $R_2$ and $R_3$ may be applied to the input terminals in any random manner without affecting the operation of the sorting apparatus. The manner in which the read heads $R_0$, $R_1$, $R_2$ and $R_3$ are connected, however, will affect the exchanges made in the exchange flip-flops 67 of the two-way sorting network 40 after an actual sort has been completed. This effect must be taken into consideration when applying inputs to the "and" gates 80, 82, 84, 86. Irrespective of the manner in which the read heads $R_0$, $R_1$, $R_2$ and $R_3$ are connected to the sorting network 20, however, the exchanges after an actual sort has been completed will be uniformly consistent throughout any of the periods A, B, C or D of FIG. 6.

Referring to FIGS. 5A–5K, there is shown schematic block diagrams showing the exchanges made for the sorting network 20 for the counts 1, 2, 3, 4, 5, 6, 11, 12, 13, 14 and 16. With the numbers applied as indicated, it is apparent that only flip-flop 67 of compare-sort apparatus 40E undergoes an exchange during each of the counts 1–3 which exist for the period A. To ascertain whether these exchanges and no others are made during the period A, the voltage waveform available on lead "a" together with the signals $\overline{Q}_{EA}$, $\overline{Q}_{EB}$, $\overline{Q}_{EC}$, $\overline{Q}_{ED}$, and $Q_{EE}$ are applied to the "and" gate 80. Similarly, as is evident from FIGS. 5D–5G, only the flip-flops 67 of compare-sort apparatuses 40A and 40D undergo exchanges during the eight record blocks included in period B. Consequently, to ascertain whether or not these exchanges and no others are made during the period B, the voltage waveform available on lead "b" together with the signals $Q_{EA}$, $\overline{Q}_{EB}$, $\overline{Q}_{EC}$, $Q_{ED}$ and $\overline{Q}_{EE}$ are applied to the inputs of the "and" gate 82.

Figure 5A:
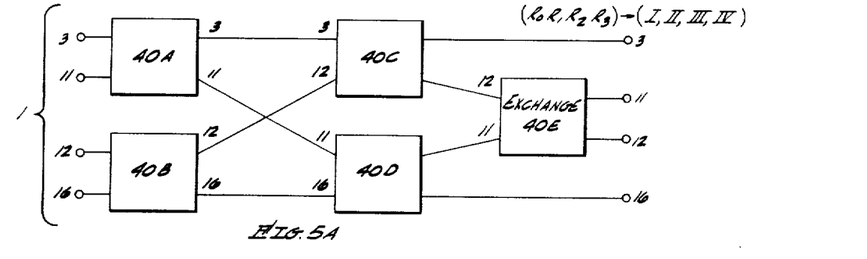
FIGS. 5A–5K illustrate the exchanges made in the respective stages of the permutation cycle of FIG. 4 for the four-way compare-sort apparatus of FIG. 2.
Figure 5B:
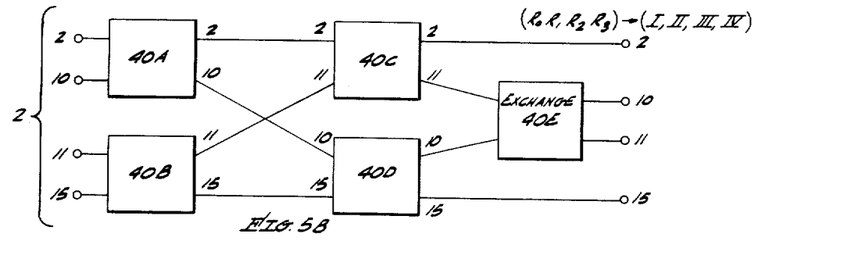
Figure 5C:
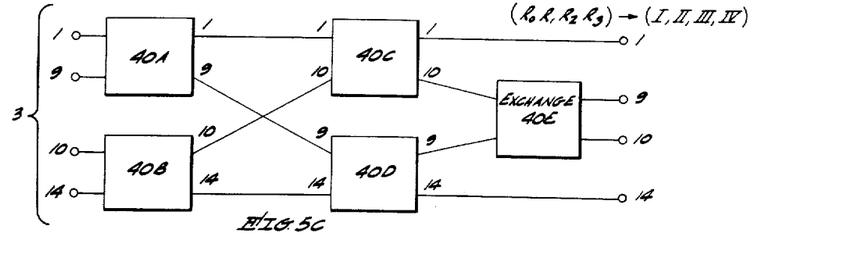
Figure 5D:
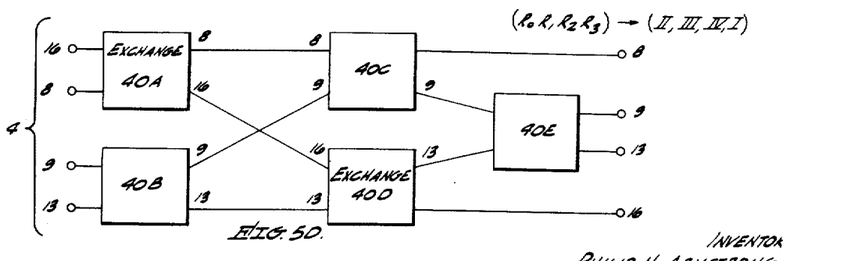
Figure 5E:
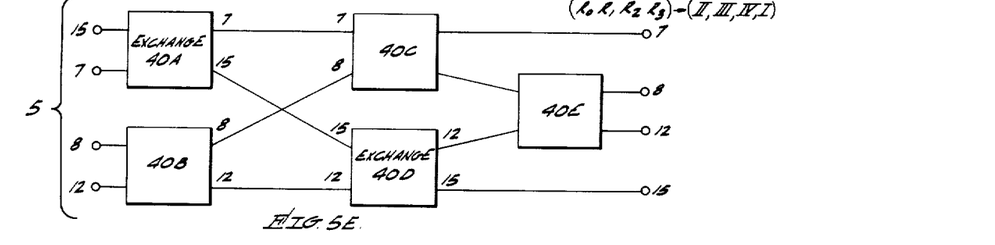
Figure 5F:
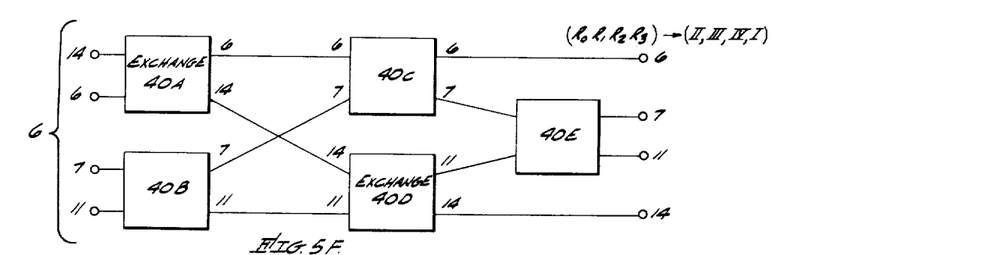
Figure 5G:
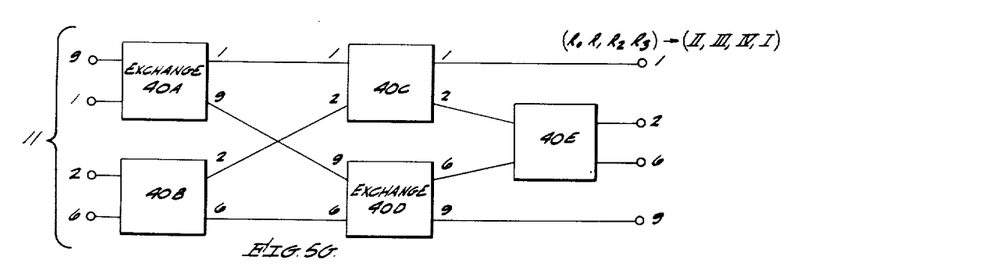
Figure 5H:
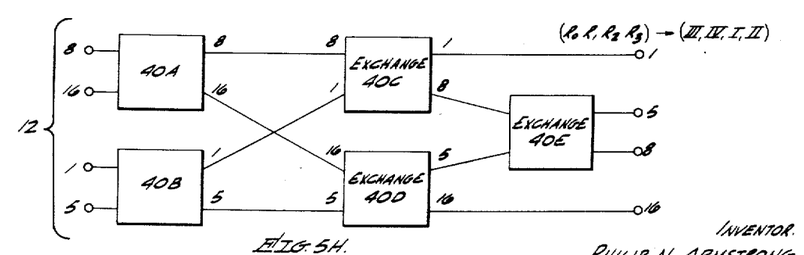
Figure 5I:
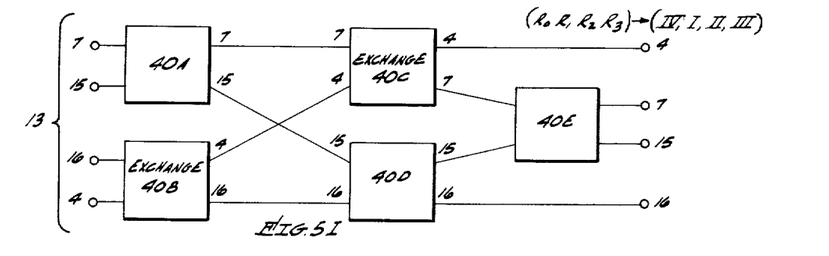
Figure 5J:
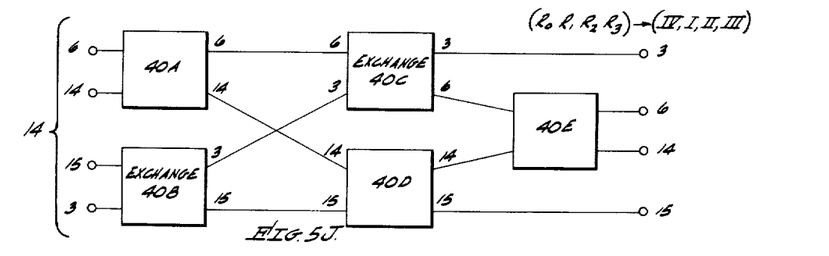
Figure 5K:
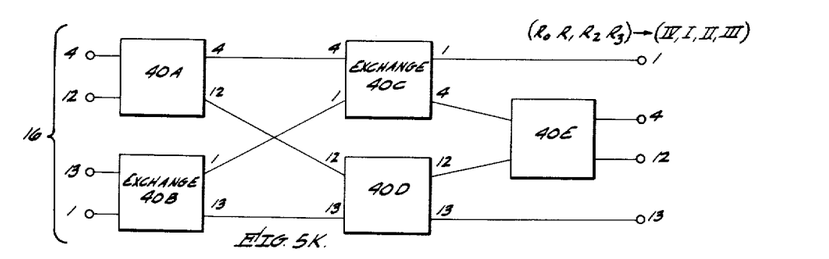

Next, it is noted from FIG. 5H of the drawings that during count 12, flip-flops 67 of compare-sort apparatuses 40C, 40D and 40E undergo exchanges. Thus, to determine whether these were the only exchanges during period C, the voltage waveform available on lead "c" together with the signals $\bar{Q}_{EA}$, $\bar{Q}_{EB}$, $Q_{EC}$, $Q_{ED}$ and $Q_{EE}$ are applied to the inputs of the "and" gate 86. Lastly, FIGS. 5I–5K of the drawings indicate that during counts 13 through 16 the flip-flops 67 of compare-sort apparatuses 40B and 40C experience exchanges when the record blocks of the file have been previously sorted. To determine whether they are the only exchanges during period D, the voltage waveform available on lead "d" together with the signals $\bar{Q}_{EA}$, $Q_{EB}$, $Q_{EC}$, $\bar{Q}_{ED}$ and $\bar{Q}_{EE}$ are applied to the inputs of the "and" gate 86.

Any information level signal appearing at the output of the "and" gates 80, 82, 84 or 86 is applied through an "or" gate 87 to an input of the "and" gate 88 and to the input of inverter 89, the output of which is applied to an input of "and" gate 90. Thus, if at the end of each record block the proper exchanges have been made, the record count pulse 11 will flow through the "and" gate 88 to advance the counter 92 by one. On the other hand, if at the end of a record block either more or less exchanges have been made than proper to indicate that the file is in sequence, a zero level signal will be impressed on the inverter 89 whereby an information level signal is applied to the "and" gate 90. Subsequent occurrence and application of a record count pulse 11 of the "and" gate 90 will then reset the counter 92 whereby the counting must commence over from zero.

Upon reaching a predetermined count preferably equivalent to a complete cycle of permutation, which in the present example is sixteen, an information level signal is generated and applied to "and" gate 94. Subsequent appearance of a record block pulse 11 on the remaining input of "and" gate 94 resets the operation control flip-flop 24 and thus terminates the sorting operation, as previously explained.

It is to be noted that the foregoing embodiment has been described by way of example, only. It is apparent that systems may be adopted which employ more or less than four inputs to the sorting network 20 and which include varying numbers of two-way compare-sort apparatuses 40 which may be interconnected in a number of different ways. In each case, however, the characteristic will always exist whereby predetermined exchanges will be made which successively occur in the same place for numbers of times equal to the numbers of record blocks stored by the respective memory elements which in the present example are the tracks 12, 13, 14 and 15.

What is claimed is:

1. In an apparatus having a series of $n$ delay devices for providing storage for integral numbers of lengths of equal length character data wherein $n$ is an integer no less than two, means including no less than $(n-1)$ bi-stable devices coupled to the output of each of said delay devices for sorting the character data simultaneously appearing at the outputs thereof into an ordered sequence defined by the relative magnitude of the character data, and means for simultaneously applying each successive sequence of character data to successive inputs of said series of $n$ delay devices, respectively, with said first character data of successive sequences being applied in succession to the input of each delay device for successive intervals of time substantially equal to the delay interval provided by the preceding delay device of said series of $n$ delay devices whereby subsequent to said character data being arranged in an ordered sequence certain predetermined changes of state are made by said no less than $(n-1)$ bi-stable devices during each interval of time corresponding to each respective delay interval: an apparatus for determining when said character data are arranged in an ordered sequence comprising means including $n$ gating elements responsive to the outputs of said no less than $(n-1)$ bi-stable devices for successively producing information level signals upon the occurrence of said certain predetermined changes of state, and means responsive to said successive information level signals for counting successive intervals of time corresponding to each character data during which said information level signal is produced and for producing an output signal when said count is equal to no less than the integral number of lengths of character data stored by the longest of said $n$ delay devices.

2. The apparatus for determining when said character data are arranged in an ordered sequence as defined in claim 1 wherein said output signal is produced when said count is equal to no less than the total number of character data to be arranged in the ordered sequence.

3. The apparatus for determining when said character data are arranged in an ordered sequence as defined in claim 1 which additionally includes means for generating $n$ information level signals concurrent with said successive intervals of time and wherein said $n$ gating elements responsive to the outputs of said no less than $(n-1)$ bi-stable devices constitute, respectively, $n$ "and" gates each responsive to one of said $n$ information level signals together with outputs from each of said no less than $(n-1)$ bi-stable devices.

4. In an apparatus for handling a plurality of character data having substantially equal lengths and having a series of $n$ memory elements for providing storage for said plurality of equal length character data wherein $n$ is a positive integer no less than two, the first memory element of which is considered to follow the last, one of said memory elements providing memory for one length of said character data and the remaining memory elements providing memory for the integral numbers of the remaining lengths of character data, circuit means including no less than $(n-1)$ bi-stable devices and a character data input from each of said memory elements and a corresponding number of character data outputs for dispatching simultaneously entered character data from said inputs to said outputs so that such character data appear simultaneously from the first to the last on said outputs in a predetermined ordered sequence as defined by the relative magnitude of the character data, and means for simultaneously connecting the first to the last of said outputs, respectively, to successive inputs of each of said $n$ memory elements of said series, with the first of said outputs being connected cyclically to each successive memory element of said series for a determinable interval of time that is directly proportional to the extent of the memory provided by the preceding memory element of the series whereby subsequent to said character data being sorted in accordance with said predetermined ordered sequence certain predetermined changes of state are made by said no less than $(n-1)$ bi-stable devices during each interval of time concurrent with each of said determinable intervals of time: an apparatus for determining when all of said character data are arranged in accordance with said predetermined ordered sequence comprising means including $n$ gating elements responsive to the outputs of said no less than $(n-1)$ bi-stable devices for successively producing information level signals upon the occurrence of said certain predetermined changes of state, means responsive to said successively produced information level signals for counting successive intervals of time corresponding to each character data during which said information level signal is produced, and means responsive to said last-named means for producing an output signal when said count is substantially equal to the total number of character data stored by said $n$ memory elements.

No references cited.